United States Patent
Couture

(10) Patent No.: US 9,530,583 B2
(45) Date of Patent: Dec. 27, 2016

(54) DEVICE FOR AN OUTDOOR SWITCHING APPARATUS

(75) Inventor: Pierre Couture, Boucherville (CA)

(73) Assignee: Hydro-Quebec, Montreal, Quebec (CA)

( * ) Notice: Subject to any disclaimer, the term of this patent is extended or adjusted under 35 U.S.C. 154(b) by 164 days.

(21) Appl. No.: 14/372,155

(22) PCT Filed: Jan. 19, 2012

(86) PCT No.: PCT/CA2012/000064
§ 371 (c)(1),
(2), (4) Date: Jul. 14, 2014

(87) PCT Pub. No.: WO2013/106898
PCT Pub. Date: Jul. 25, 2013

(65) Prior Publication Data
US 2015/0008030 A1 Jan. 8, 2015

(51) Int. Cl.
*H01H 9/02* (2006.01)
*H01H 9/54* (2006.01)
(Continued)

(52) U.S. Cl.
CPC ............. *H01H 9/0271* (2013.01); *H01H 9/54* (2013.01); *H02B 1/16* (2013.01); *H02B 1/56* (2013.01);
(Continued)

(58) Field of Classification Search
CPC .... H01H 9/0271; H01H 9/54; H01H 2213/00; H01H 2211/006; H01H 2211/00; H01H 2223/008; H01H 2223/00; H01H 2239/044; H02G 7/20; H02B 1/16
(Continued)

(56) References Cited

U.S. PATENT DOCUMENTS

| 4,188,514 A | * | 2/1980 | Patel | ................. H02G 5/061 200/302.1 |
| 5,930,111 A | | 7/1999 | Yamazaki et al. | |

(Continued)

FOREIGN PATENT DOCUMENTS

| CA | 2441241 | 12/2003 |
| WO | WO2008154749 | 12/2008 |

OTHER PUBLICATIONS

International Search Report, International Application No. PCT/CA2012/000064, Oct. 17, 2012, 2 pages.
(Continued)

*Primary Examiner* — Dimary Lopez Cruz
(74) *Attorney, Agent, or Firm* — Brinks Gilson & Lione

(57) ABSTRACT

This invention concerns a device for an outdoor switching apparatus of an electrical power line, the switching apparatus being enclosed within a case. The device includes a wall made of electrically conductive material capable of blocking sun rays. The device also includes a fastening assembly for fastening the wall with respect to the case in a position for blocking, at least partially, sun rays from hitting the case during day time. The fastening assembly has at least one spacer made of insulating material for spacing the wall with respect to the case, thus delimiting an air gap between the wall and the case. The device also includes at least one electrical connector for electrically connecting the wall to circuitry of the switching apparatus, located inside the case, for powering and voltage monitoring.

17 Claims, 14 Drawing Sheets

(51) Int. Cl.
*H01H 9/00* (2006.01)
*H02B 1/56* (2006.01)
*H02B 5/02* (2006.01)
*H02B 1/16* (2006.01)
*H02G 7/20* (2006.01)

(52) U.S. Cl.
CPC .................. *H02B 5/02* (2013.01); *H02G 7/20* (2013.01); *H01H 2211/006* (2013.01); *H01H 2213/00* (2013.01); *H01H 2223/008* (2013.01); *H01H 2227/024* (2013.01); *H01H 2239/034* (2013.01); *H01H 2239/044* (2013.01)

(58) Field of Classification Search
USPC ... 174/45 R, 40 R, 135; 361/1; 200/3.4, 293, 200/306, 303
See application file for complete search history.

(56) References Cited

U.S. PATENT DOCUMENTS

| | | |
|---|---|---|
| 6,018,152 A | 1/2000 | Allaire et al. |
| 6,396,172 B1 | 5/2002 | Couture |
| 6,486,569 B2 | 11/2002 | Couture |
| 7,235,900 B1 | 6/2007 | Couture |
| 7,639,460 B2 | 12/2009 | Couture et al. |
| 2009/0250449 A1 | 10/2009 | Petrenko et al. |
| 2010/0176814 A1 | 7/2010 | Couture |

OTHER PUBLICATIONS

Written Opinion of the International Searching Authority, International Application No. PCT/CA2012/000064, Oct. 18, 2012, 3 pages.
Couture, Pierre, Power Flow and Stability Control Using an Integrated HV Bundle-Controlled Line-Impedance Modulator, Power Delivery, IEEE Transactions vol. 25 , Issue: 4, pp. 2940-2949.
Couture, Pierre, Smart Power Line and photonic de-icer concepts for transmission-line capacity and reliability improvement, Science Direct, Cold Regions Science and Technology, vol. 65, Issue 1, pp. 13-22.
Zhijin, Zhang, The Method and Test of De-icing on Four Bundled-conductors by Leading Running Current into Various Sub-conductor Combinations, The 14th International Workshop on Atmospheric Icing of Structures, Chongqing, China, May 8-May 13, 2011, pp. 1-6.
Guanghui, Chang, Novel Deicing Approach of Overhead Bundled Conductors of EHV Transmission Systems, Power Delivery, IEEE Transactions, vol. 24 , Issue: 3, pp. 1745-1747.
Divan, D et al., Distributed Facts—A New Concept for Realizing Grid Power Flow Control, IEEE Transactions on Power Electronics, vol. 22, No. 6, Nov. 2007, pp. 2253-2260.
Couture, Pierre, Switching modules for the extraction/Injection of Power (without Ground or Phase Reference) From a Bundled HV Line, EEE Transactions on Power Delivery, vol. 19, No. 3, Jul. 2004, pp. 1259-1266.
Amin, S.M. et al., Toward a smart Grid, IEE Power and Energy Magazine, 2005, pp. 34-41.

* cited by examiner

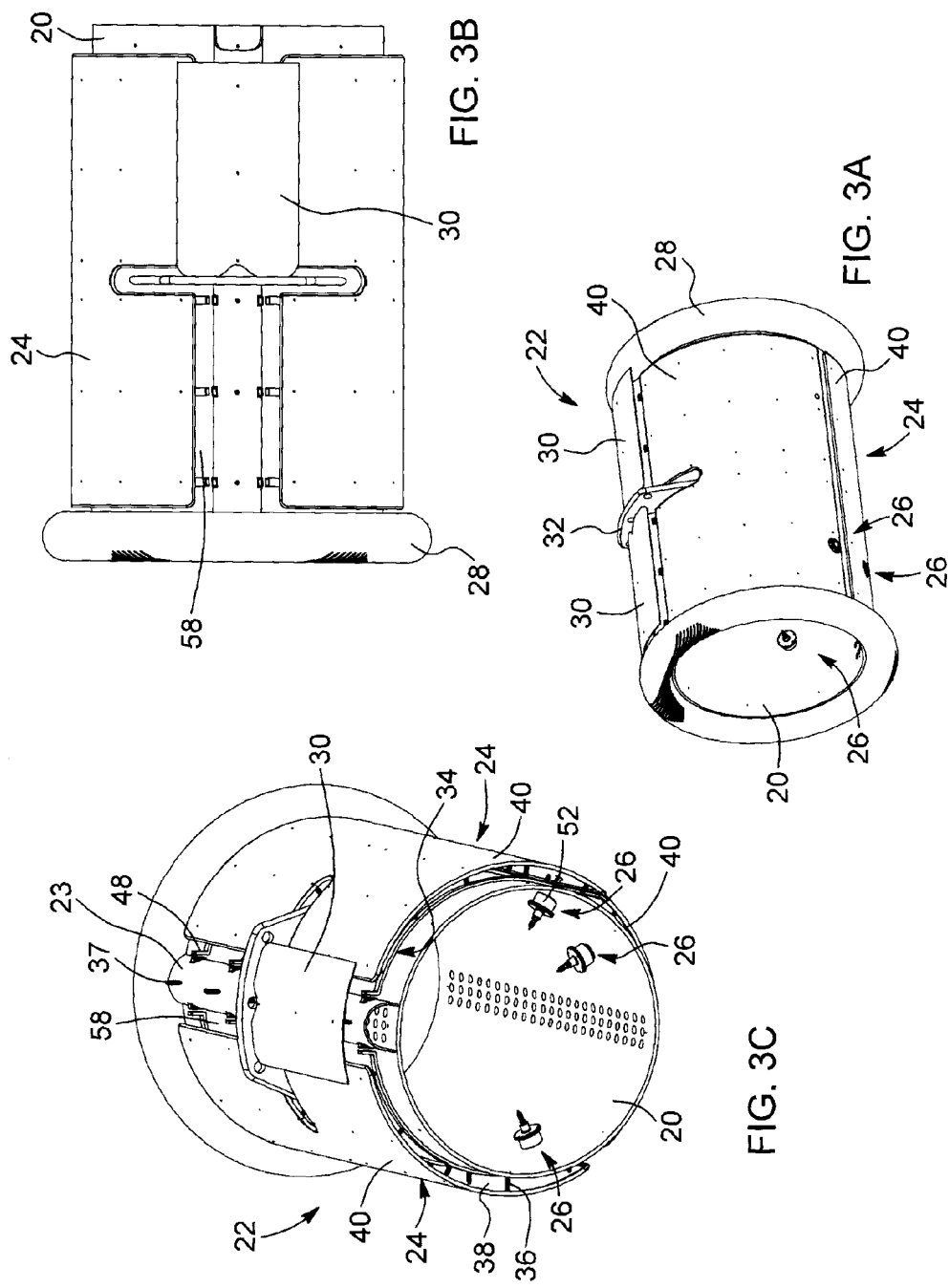

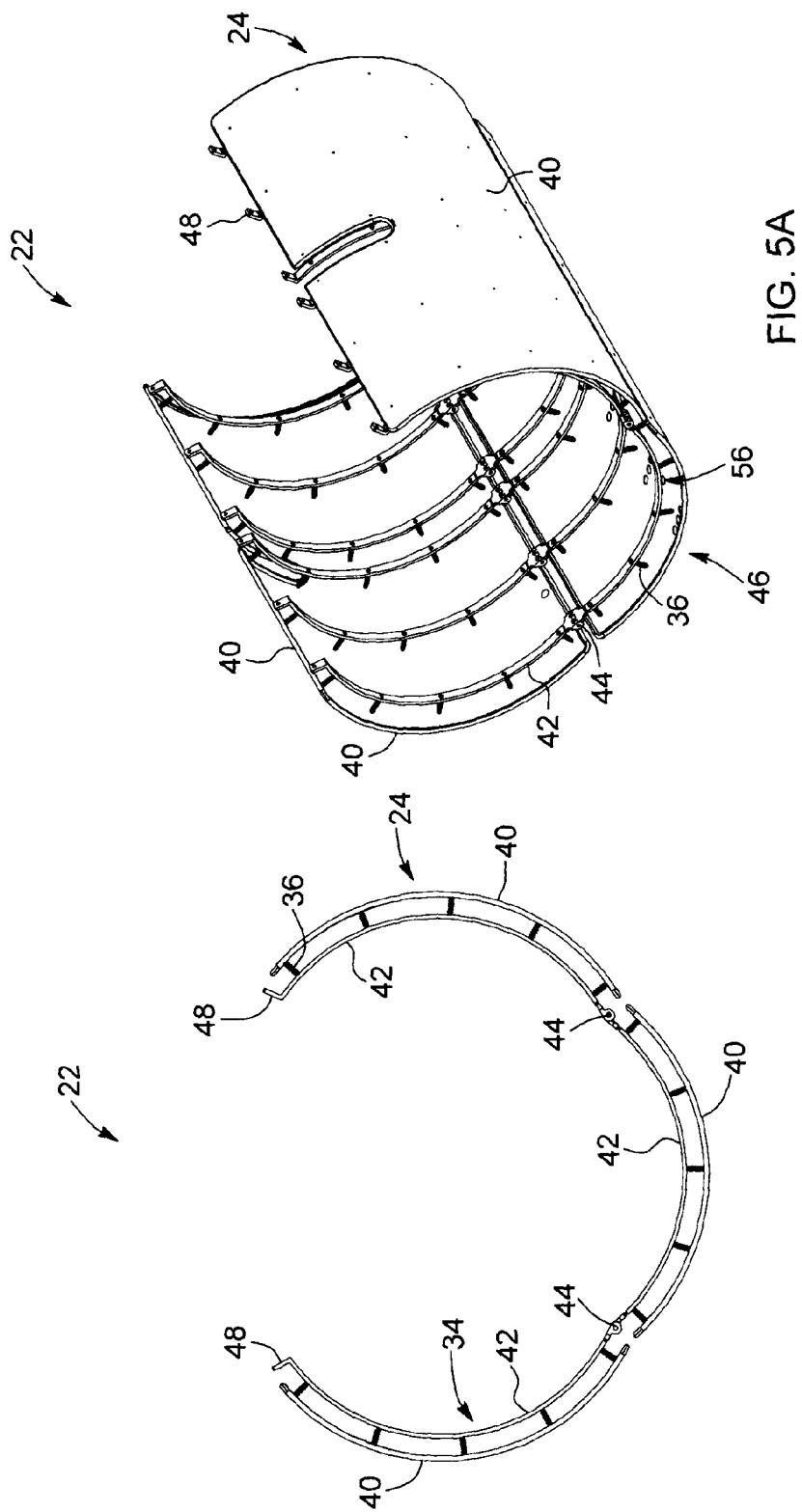

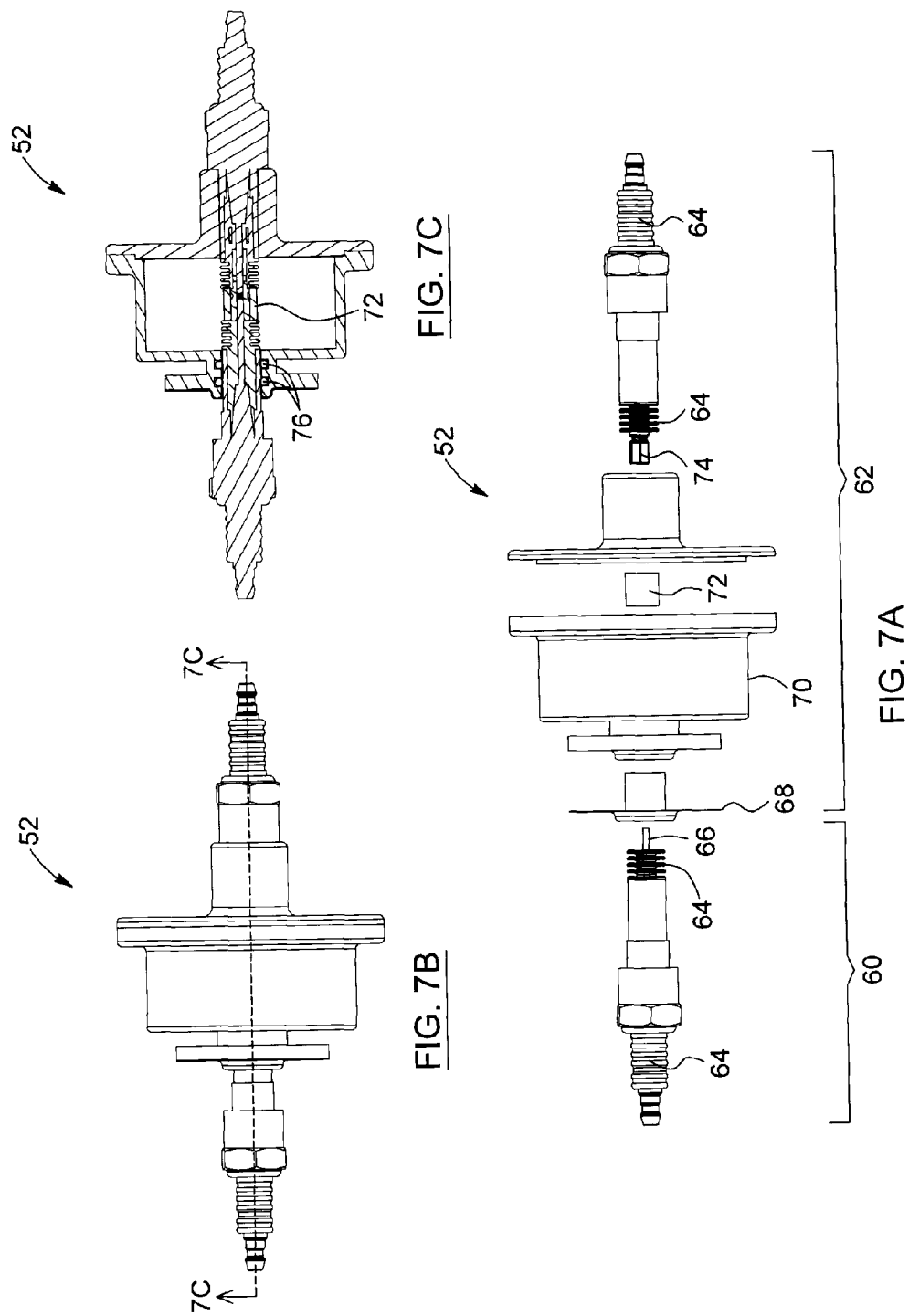

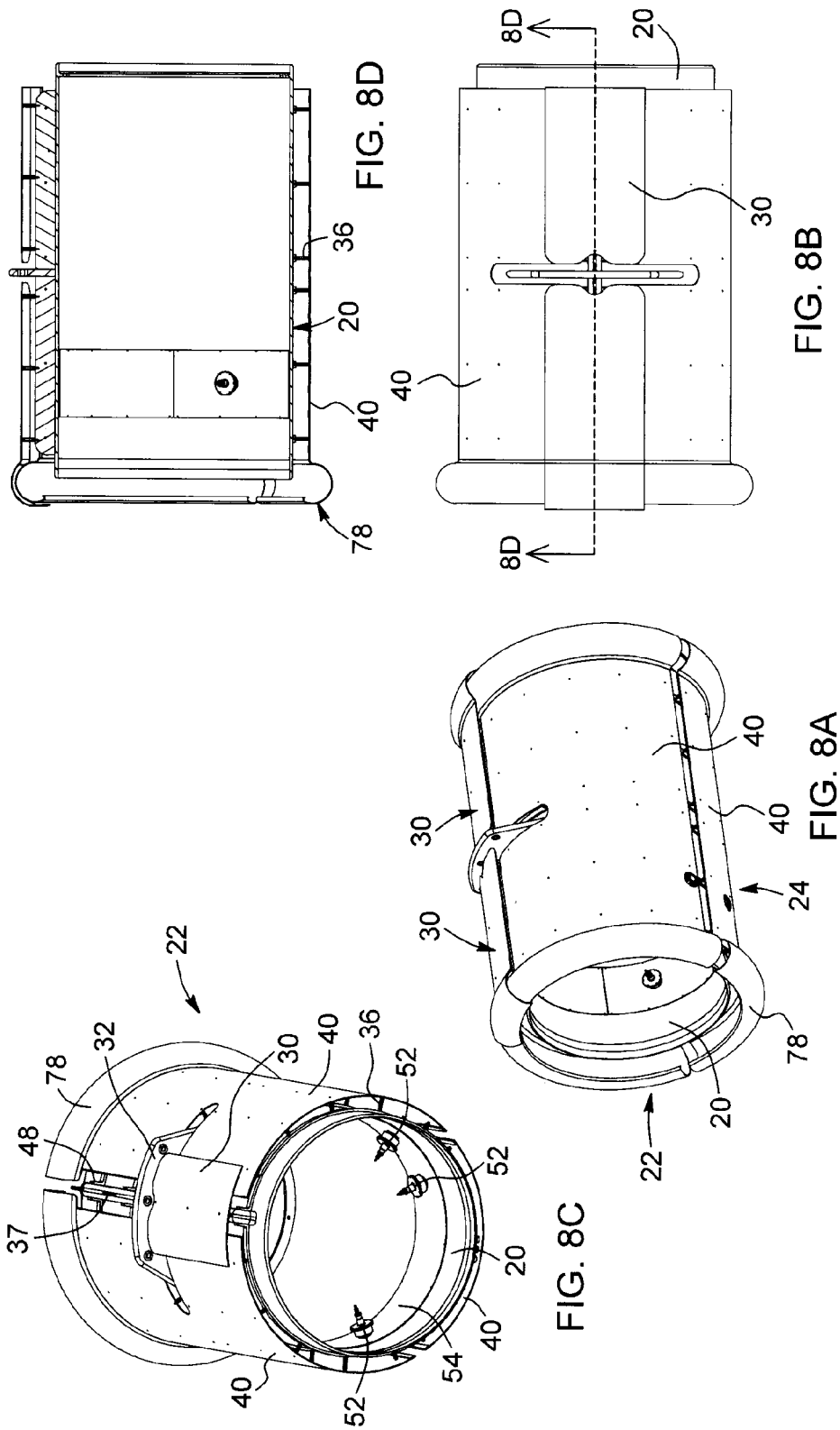

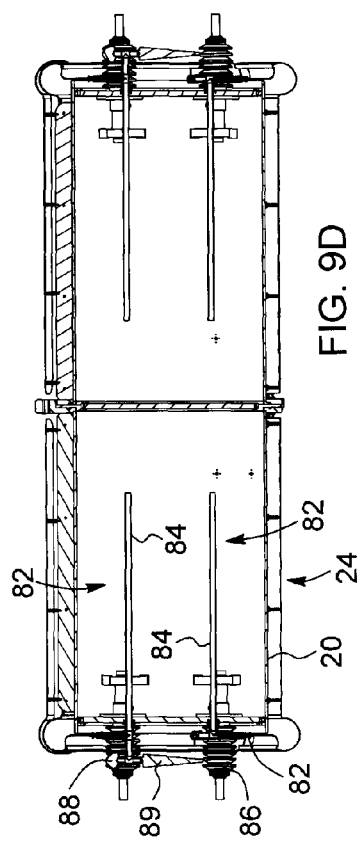
FIG. 9D
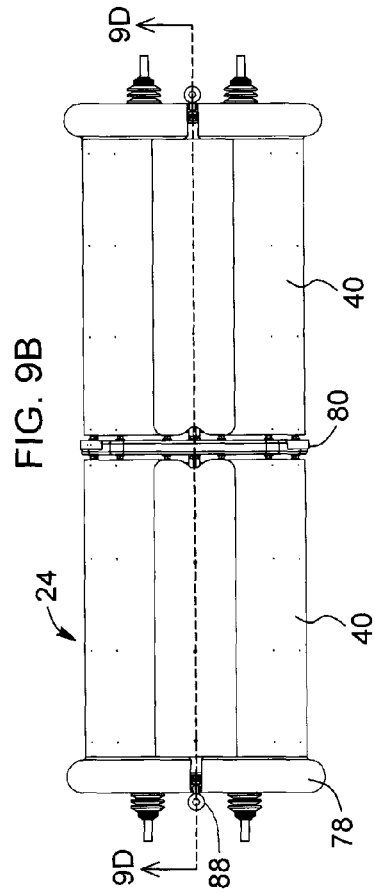
FIG. 9B
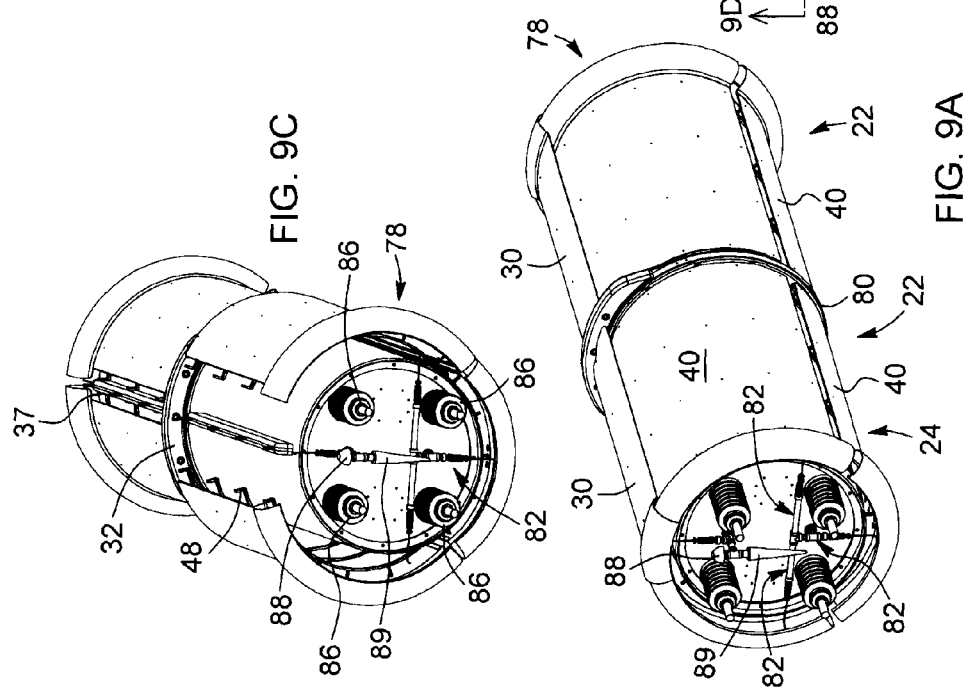
FIG. 9C
FIG. 9A

DEVICE FOR AN OUTDOOR SWITCHING APPARATUS

CROSS-REFERENCE TO RELATED APPLICATIONS

The present application is the national phase of International Application No. PCT/CA2012/000064, entitled "DEVICE FOR AN OUTDOOR SWITCHING APPARATUS", filed on Jan. 19, 2012, which is incorporated herein by reference in its entirety.

FIELD OF THE INVENTION

The present invention relates to outdoor switching apparatuses used to monitor and control a phase line of a segment of an electrical power line. More specifically, the invention relates to devices for protecting outdoor switching apparatuses.

DESCRIPTION OF PRIOR ART

Known in the art, U.S. Pat. No. 7,235,900 B1 (COUTURE), granted on Jun. 26, 2007, describes a switching apparatus and a method for varying the impedance of a phase line of a segment of an electrical power line, the phase line including n conductors. The apparatus includes, for each the conductors, a passive component and a pair of electromechanical and electronic switches, the pair of switches being able to connect and disconnect in a selective manner the passive component in series with the corresponding conductor, the switches of each pair being controllable independently. The apparatus also includes a detecting device for detecting the current operating conditions of the phase line, and a control device for controlling each pair of switches according to the current operating conditions.

PCT/CA2008/001185 (COUTURE), published as WO/2008/154749, describes an apparatus and a method for monitoring a phase line of a part of an electrical energy transmission line. The apparatus comprises a monitoring device of a parameter of a phase line. The parameter is representative of current operational conditions of the phase line and has a known propagation speed. The apparatus also comprises a device for generating a detection signal of an event each time a parameter has a value exceeding a threshold, and for storing a reception time when the detection signal is generated. The apparatus also has a device for transmitting a signal representative of a geographic location of the extremity of the section and a device for geographically locating the event once two consecutive detection signals are generated from the signal representative of the geographic location, and on the reception times associated with two detection signals.

U.S. Pat. No. 7,639,460 (COUTURE) describes a switching apparatus which includes a vacuum interrupter connected in series with one of the conductors on a phase line of a power line. A controllable motor allows selectively opening and closing the vacuum interrupter. A detector allows detecting a parameter representative of current operating conditions of the phase line; and a controller allows controlling the controllable motor according to the parameter detected by the detector.

PCT/US2009/031826 (PETRENKO) published under WO2009123781, PCT/CN2008/072650 (GONG) published under WO2009/049544 and U.S. Pat. No. 6,018,152 (ALLAIRE et al.) describe yet other devices for use on power lines, for de-icing purposes. Document entitled "The Method and Test of De-icing on Four Bundled-conductors by Leading Running Current into Various Sub-Conductors Combinations" by Zhang Zhijin, explains how de-icing of bundled conductors was verified and tested by leading running current into various sub-conductors combination. Zhang Zhijin, Bi Moaqiang, Jiang Xingliang, Huang Haizhou, Hu Jianlin, Sun Ciaxin, "The Method and Test of De-icing on Four Bundled-conductors by Leading Running Current into Various Sub-Conductors Combinations", $14^{th}$ International Workshop of Atmostpheric Icing Structures, Chongqing, China, May 8-13, 2011.

Referring to FIG. 1, a portion of a high voltage power line 10 is provided with outdoor switching apparatuses 14. Each phase line A, B, C, is provided with a pair of switching apparatuses 14, mounted back-to-back. The pairs of switching apparatuses 14 are located on the same tower 12, each pair of back-to-back switching apparatuses 14 being at a different potential, this potential being the one of the phase line A, B or C to which the pair of apparatuses 14 is hooked. Each of the switching apparatuses 14 includes a casing containing the circuitry required to monitor and control the corresponding phase line. Capacitive power supply and voltmeter antennas 16 are connected to phase conductor bundle, outside of the switching apparatuses 14, and are thus exposed to sun rays and bad weather.

Referring to FIG. 2, one of the prior art switching apparatus 14 from FIG. 1 is shown. During day time, sun rays hit directly the case 20 of the switching apparatus 14, thereby heating the apparatus 14. This heat can cause premature wear of the electric and electronic circuits it contains. Such configuration requires using thermal insulation within the case 20 of the switching apparatus 14, in order to limit heat transfers to the internal circuitry of the apparatus 14.

The switching apparatus 14 is provided with an external lightning arrester module and capacitive antenna 16. The antenna 16 is linked to the inside of the switching apparatus through axial feedthrough connectors, and wires 18. The capacitive antenna 16 can be used for generating power to the switching apparatus 14, and for measuring the potential of the phase line. It also requires using wires 18, which can be insulated, for intermediate voltages of the order of 1 to 10 kV, in order to be able to connect the capacitive antenna and voltmeter to the switching apparatus. These wires 18 are exposed to ultraviolet radiation, and to bad weather such as snow and ice storms, which can damage them.

It is believed that there is a need for cooling outdoor switching apparatuses, as well as for bringing an electrical signal within the case of an outdoor switching apparatus more efficiently.

SUMMARY OF THE INVENTION

An object of the present invention is to provide a device addressing the above-mentioned need.

The present invention provides a device for an outdoor switching apparatus of an electrical power line. The switching apparatus is enclosed within a case. The device comprises:
  a wall made of electrically conductive material capable of blocking sun rays;
  a fastening assembly for fastening the wall with respect to the case in a position for blocking, at least partially, sun rays from hitting the case during day time, the fastening assembly having at least one spacer made of insulating material for spacing the wall with respect to the case, thus delimiting an air gap between the wall and the case; and at least one electrical connector for electrically connecting the wall to circuitry of the switching apparatus, located inside the case.

Preferably, the at least one spacer comprises several spacers.

Preferably, the wall comprises several sections, each section of the wall being spaced apart from the case by at least one of the spacers.

Preferably, the sections are curved for forming a cylindrical shaped wall to enclose the switching apparatus.

Preferably, the fastening assembly comprises curved ribs connected respectively to internal portions of the sections of the cylindrical shaped wall by means of the spacers so that the sections of the wall are electrically insulated form the ribs. The fastening assembly also includes hinges connected to ends of the ribs so that the device forms an articulated structure capable of moving between a closed position where the articulated structure has a cylindrical shape for enclosing the apparatus by having the ribs in contact with the case, and an opened position.

Preferably, each of the at least one electrical connector comprises a radial feedthrough mountable through the case of the switching apparatus.

Preferably, each of the at least one electrical connector comprises an axial feedthrough mountable through the case of the switching apparatus.

Preferably, each of the spacers comprises an insulating rod extending radially between the cylindrical shaped structure and the wall.

Preferably, each section of the wall has an extremity, on at least one side of the cylindrical shaped wall, the extremity being curved to form a corona ring on the side of the cylindrical shaped wall.

Preferably, the device is used in combination with the outdoor switching apparatus, wherein the circuitry of the outdoor switching apparatus comprises a power supply having an input connected to the wall via the at least one electrical connector, and an output for powering the switching apparatus.

Preferably, the device is used in combination with the outdoor switching apparatus, wherein the circuitry of the switching apparatus comprises a voltmeter having an input connected to the wall via the at least one electrical connector, and an output for generating a signal representative of a voltage on a phase of the electrical power line.

Preferably, the wall has in its upper portion a longitudinal air gap separating two adjacent sections of the wall, the device comprising a longitudinal cover mounted above the longitudinal air gap.

Preferably, the wall is provided with at least two openings, one of the openings being higher than the other opening to allow air convection current to circulate through the at least two openings.

Preferably each section of the wall is electrically insulated from one another, and the at least one electrical connector comprises several electrical connectors respectively connected to the sections of the wall.

Preferably, the wall is electrically insulated from one another, and the at least one electrical connector comprises several electrical connectors respectively connected to the sections of the wall.

Preferably, the longitudinal cover is electrically insulated from the sections of the wall, and the at least one electrical connector comprises an electrical connector connected to the longitudinal cover. Preferably, the longitudinal cover is curved, the curved portion being also electrically insulated from the sections of the wall.

The invention also concerns a tower for an electrical power line having at least two phase lines. The tower comprises a frame and, for each of the phase line, a device as described above, in combination with the outdoor switching apparatus to form a switching module. Each switching module is spaced apart from one another, the tower also comprising at least one conducting screen mounted on the frame and physically positioned between two adjacent switching modules.

The invention will be better understood from a reading of the non-restrictive description that follows of a preferred embodiment thereof, and upon referring to the appended drawings.

BRIEF DESCRIPTION OF THE DRAWINGS

FIG. 3A is a perspective view of a device according to a preferred embodiment of the invention, within its environment. FIG. 3B is a top view of the device of FIG. 3A, shown partially, within its environment. FIG. 3C is a perspective view of the device of FIG. 3A, shown partially.

FIG. 5A is a top perspective view of the device in an open configuration, according to a preferred embodiment. FIG. 5B is a front view of the device of FIG. 5A.

FIG. 7A is an exploded side view of a connector of the device, according to a preferred embodiment of the invention. FIG. 7B is a side view of the connector of FIG. 7A, shown assembled. FIG. 7C is a cross-sectional side view of FIG. 7B, taken along line 7C-7C.

FIG. 8A is a perspective view of a device according to a preferred embodiment of the invention, within its environment. FIG. 8B is a top view of the device of FIG. 8A, shown partially, within its environment. FIG. 8C is a perspective view of the device of FIG. 8A, shown partially. FIG. 8D is a cross-sectional side view, taken along line 8D-8D of FIG. 8B.

FIG. 9A is a perspective view of two devices according to preferred embodiment of the invention, within its environment. FIG. 9B is a top view of the device of FIG. 9A, shown partially, within its environment. FIG. 9C is a perspective view of the device of FIG. 9A, shown partially. FIG. 9D is a cross-sectional side view, taken along line 9D-9D of FIG. 9B.

DETAILED DESCRIPTION OF DRAWINGS

Figure 1:
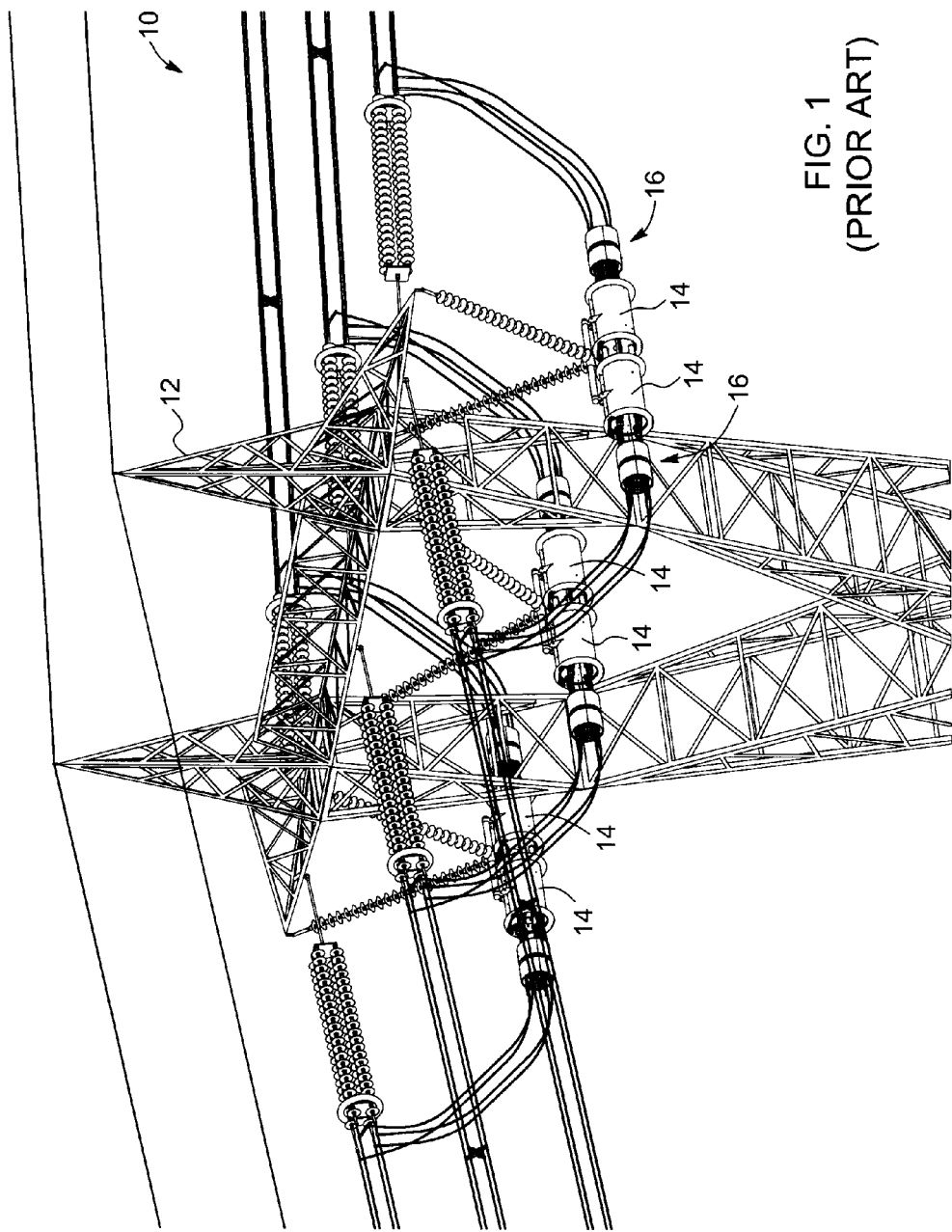
FIG. 1 is a partial perspective view of an anchor tower, provided with back-to-back switching apparatuses, according to the prior art.

In the following description, similar features in the drawings have been given similar reference numerals. In order to preserve clarity, certain elements may not be identified in some figures if they are already identified in a previous figure.

Figure 2:
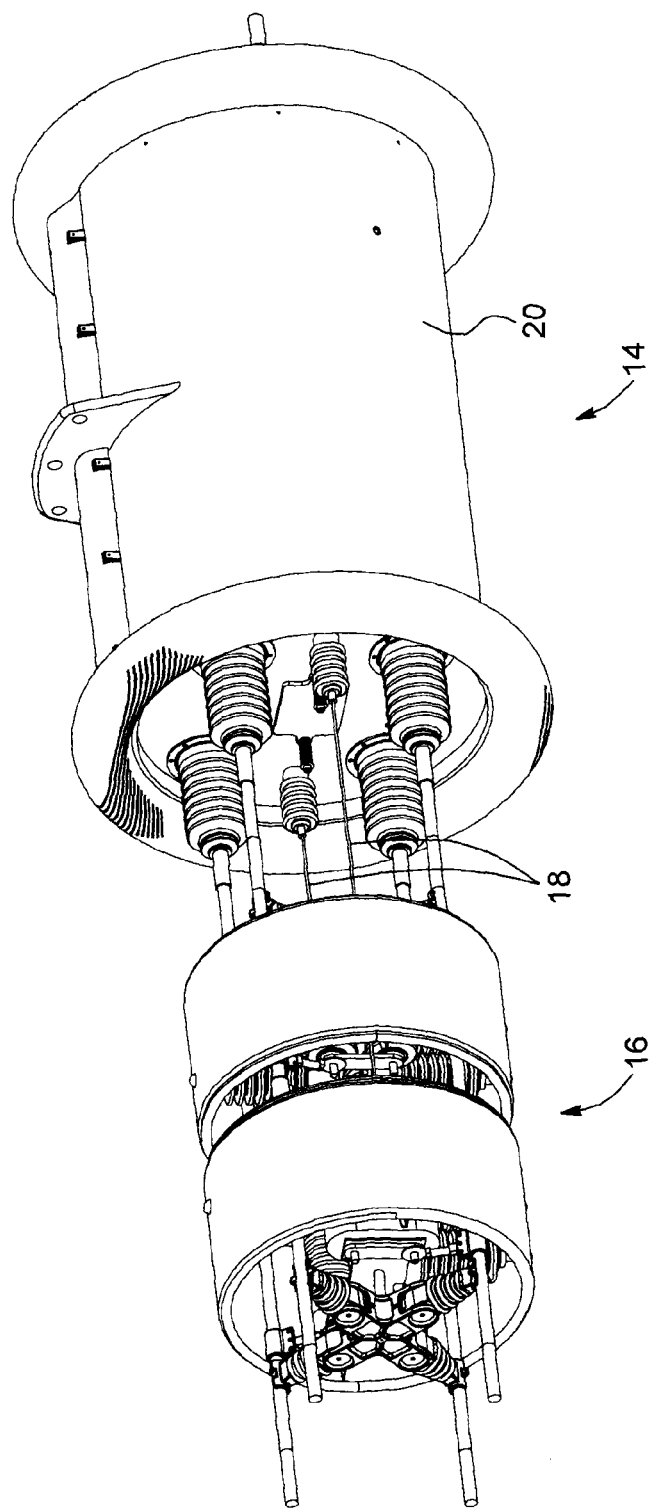
FIG. 2 is a perspective side view of a switching apparatus within its environment, according to the prior art.

Referring to FIG. 3A, a case 20 surrounded by a device 22 is shown. The case 20 is for enclosing an outdoor switching apparatus. The function of the case 20 is similar to the one used for the switching apparatus 14 of FIGS. 1 and 2. The case 20 can also be referred to as a shell. The case 20 is for containing the components and circuitry of the switching apparatus, required to control and to monitor a phase line of an electrical power line. This internal circuitry and electrical switches usually part of the switching apparatus are not shown in FIGS. 3A to 9D, for clarity purposes. The device 22 includes a wall 24 made of an electrically conductive material capable of blocking sun rays. The material can be metal for example. The wall 24 can also be referred to as a conducting screen or antenna. The device 22 includes at least one electrical connector 26 for electrically connecting the wall 24 to circuitry of the switching apparatus, located inside the case. In the present case, the case 20 of the switching apparatus is provided with corona rings 28 at both extremities. The corona rings 28 are electrically connected to the case 20. The rounded shape of the corona rings 28 advantageously allows changing the shape of the electric field at the periphery of the case 20, spreading it out, in order to avoid or at least reduce corona discharge. The device 22 is provided with two longitudinal covers 30 on each side of the hook 32 of the apparatus. The covers 30 serve as weather protection hats.

In FIGS. 3B and 3C, the device 22 is shown surrounding the case 20, where one of the corona rings 28 has been removed, in order to better see some of the components of the device 22 which would otherwise be hidden. One of the longitudinal cover 30 has also be removed in order to see how the device 22 is fastened to the case 20. The device 22 includes a fastening assembly 34 for fastening the wall 24 with respect to the case 20 in a position for blocking, at least partially, sun rays from hitting the case 20 during day time. The fastening assembly 34 has at least one spacer 36 made of insulating material, for spacing the wall 24 with respect to the case 20, thus delimiting an air gap 38 between the wall 24 and the case 20.

Still referring to FIGS. 3B and 3C, the wall 24 is formed by three wall sections 40. Each section 40 is connected to a connector 26, which includes in turn a radial feedthrough 52, mounted through the case 20 of the switching apparatus. As shown in FIGS. 3A and 3C, each wall section 40 is provided with a connector 26 including a radial feedthrough 52. When referring to the connector 26, it is meant to refer to all of the components for electrically connecting the wall 24 of the device 22 to circuitry located inside the switching apparatus. As such, in the case illustrated, each connector 26 includes a radial feedthrough 52. It should also be noted that the wall 24 can be formed of one, two or several wall sections. In the case illustrated, the wall 24 is formed by three wall sections 40. Each section 40 of the wall 24 is electrically insulated from one another, the electrical connectors 26 being respectively connected to the sections 40 of the wall 24. In other words, each section 40 is provided with its own connector 26. This embodiment shown in FIGS. 3A to 3C is particularly adapted for a switching apparatus for which a corona ring 28 is located at the extremities of the case 20.

As best shown in FIGS. 3B and 3C, the wall 24 has in it upper portion a longitudinal gap 58 separating two adjacent sections 40 of the wall 24. The longitudinal cover 30 is mounted above the gap 58, to prevent ice, snow or rain from penetrating within the wall 24. The electrically conducting cover 30 is preferably mounted on insulating spacers 36, similar to the ones used for spacing away the wall 24 from the case 20.

Figure 4A:
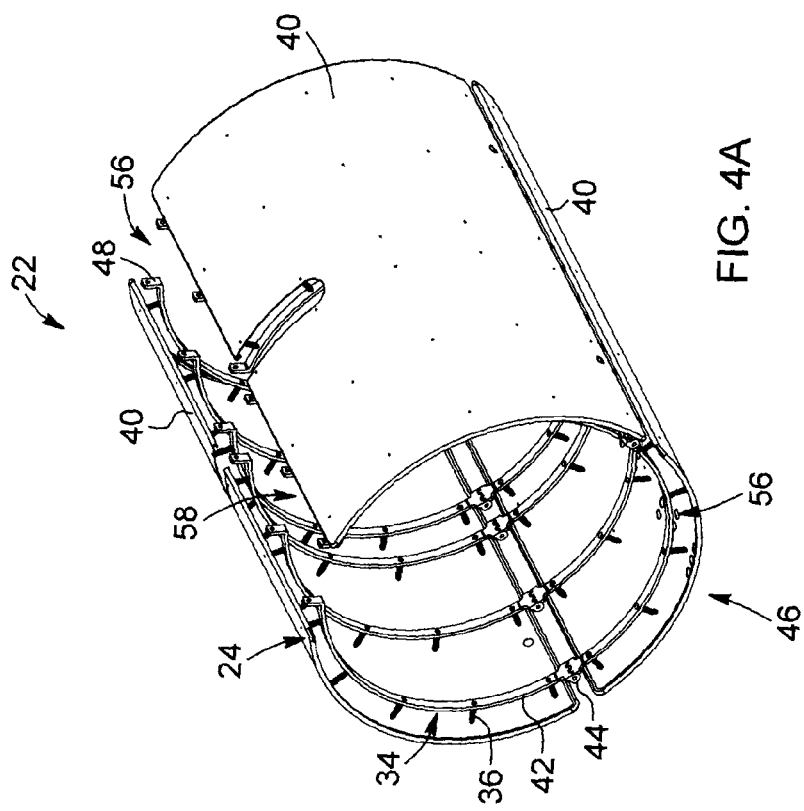
FIG. 4A is a top perspective view of a device in a closed configuration, according to a preferred embodiment.
Figure 4B:
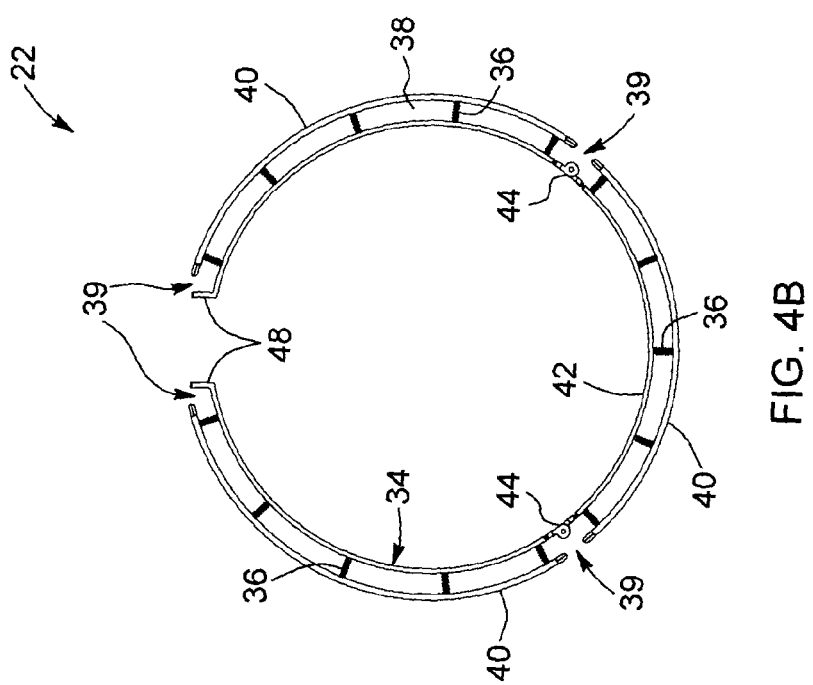
FIG. 4B is a front view of the device of FIG. 4A.

Referring to FIGS. 4A and 4B, the device 20 is shown alone, without the switching apparatus. The device 22 includes several wall sections 40, and also several spacers 36. Each section 40 includes at least one spacer 36, such that, when the device is installed around a switching apparatus, each section is spaced away from the apparatus. In the present case, the wall 24 is formed by three sections 40. The sections are curved, for forming the cylindrical shaped wall 24, for enclosing the apparatus.

By dividing the wall 24 into two or more sections 40, spaces or gaps 39 are created between each segment 40. When the device 22 is installed onto the apparatus, and the apparatus is in function, heat is generated by either the apparatus itself, or by sun rays hitting the exposed surface of the wall 24 during day time. The heated air filling the space 38 between the case 20 of the apparatus and the inner surface of the wall 24 will move upwardly and exit the space 39 located at the top and on the sides of the device, between two segments 40. This movement of the hot air creates a convection current which will draw cooler outside air to enter through the gaps or spaces 39 located at the bottom of the device 20 and through the openings 56. This circulation of air around the apparatus will advantageously cool it, which will advantageously reduce wear of the electrical and electronic components of the switching apparatus, which can occur when operating in high temperature environments. Of course, in other embodiments, it can be considered to have the wall 24 formed of a single section 40. In this case, the wall would be provided with at least two openings 56, such as shown in FIG. 4A, one being higher than the other, in order to allow air convection current to circulate through the openings. The openings 56 can take the form of a plurality of apertures, or of a single longitudinal groove extending along the length of the wall. It should be noted that the openings 56 are also useful for draining water.

Referring to FIGS. 3C, 4A and 4B, and also to FIGS. 5A and 5B, the fastening assembly 34 includes curved ribs 42. Each rib 42 is connected to an internal portion of the sections 40 of the cylindrical shaped wall 40 by means of the spacers 36. As can be appreciated, in this structure the sections 40 of the wall 24 are electrically insulated form the ribs 42. Some of the ribs 42 include a flange 48, which can also be referred to as a holding foot, to simplify the attachment of the device 22 around the apparatus. As best shown in FIG. 3C, one side of the curved ribs 42 is attached or affixed to the casing 20 of the apparatus, and the other side of the ribs is provided with spacers 36 mounted thereon. In use, the wall 24 surrounds the apparatus while being electrically insulated from it, thus floating at a different potential. Still referring to FIG. 3C, the semi-circular plate 23 located on top of the casing 20, which is part of the switching apparatus, is also provided with spacers 37, which are in this case required to insulated the cover 30 from the casing 20.

Back to FIGS. 4A, 4B, 5A and 5C, the fastening assembly 34 includes hinges 44 connected to ends of the ribs 42 such that the device forms an articulated structure 46 capable of moving between a closed position, as shown as in FIGS. 4A and 4B, and an open position, as shown in FIGS. 5A and 5B. In the close position, the articulated structure 46 has a cylindrical shape for enclosing the apparatus, and the ribs are located on the inner side of the structure 46, such that when the device is installed around the case, the ribs contact the outer surface of the case. By having an articulated structure 46 able to be move from the closed to the opened position allows the device 20 to be installed around or removed from the switching apparatus faster and more conveniently.

Figure 6:
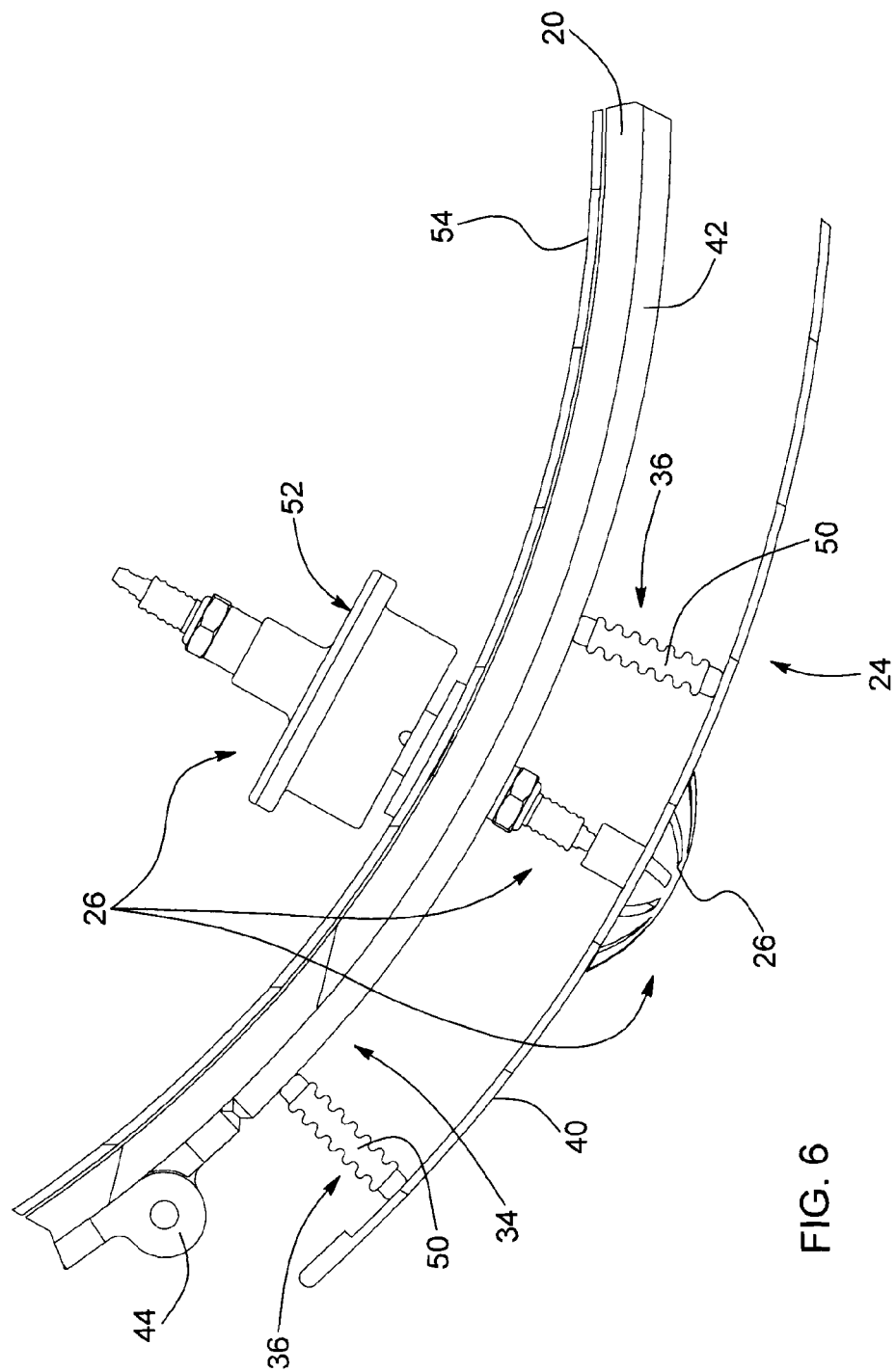
FIG. 6 is a partial side view of a device according to a preferred embodiment of the invention, within its environment.

Now referring to FIG. 6, a connector 26 of the device is shown with greater detail. In this embodiment, the connector 26 includes a radial feedthrough 52, mountable through the case 20 of the switching apparatus. As can be appreciated, the conductive portion of the radial feedthrough 52 does not contact the case 20. It is destined to connect to circuitry of the switching apparatus, as will be described more in detail later on in the description. Using a radial feedtrough 52 has the advantage of hiding most part of the connector 26 within the wall 24, protecting it from sun rays, rain, snow or ice, which could otherwise damage it. Another advantage of using a radial feedthrough 52 is that it facilitates dismounting of the device from around the switching apparatus. The case 20 is provided with an electrically conducting shield 54 acting as an electromagnetic shield.

The two spacers 36 shown each includes an insulating rod 50, extending radially between the cylindrical shaped structure of the fastening assembly 34 and the wall 40. The insulating rods 50 are provided with several dishes, in order to increase the leaking distance between the wall 24 and the case 20, so as to prevent formation of electric arcs.

Referring now to FIGS. 7A to 7C, the components forming a radial feedthrough 52 are shown. The radial feedthrough 52 includes two portions 60, 62, one 60 for mounting on the outer side of the casing 20, and the other 62 for mounting on the inner side of the casing, where the electrical and electronic components of the apparatus are located. In this case, a male connector 66 with insulators 64 is provided on portion 60, a female connector 74 with insulators 64 is provided on portion 62. The radial feedthrough 52 also includes a grounding screen 68, a cover 70, polymer insulator cover 72 and O-rings 76.

With reference to FIG. 8A, another embodiment of the device 20 is shown. In this embodiment, the cylindrical shaped wall 24 is curved on the extremity of at least one side, to form a corona ring 78. In the case illustrated, the extremity of each section 40 is curved into the corona ring 78, as well as extremities of the longitudinal covers 30. Having the corona ring 78 part of the wall 40, rather than part of the casing 20, increases the surface of the wall 24 of the device 22, the corona ring 78 being electrically insulated from the case 20. When part of the device 22, the corona ring 78 not only reduce corona discharge occurrences, it also allows increasing the area of the wall sections 40, thus increasing the capacity of the device 22 to generate power when used as part of a capacitive power supply circuit.

In FIGS. 8B to 8D, the corona ring 78 on one side of the device 22 has been removed, in order to better see components of the device 22 which would otherwise be hidden. In FIG. 8C, the longitudinal cover 30 has also be removed at the rear of the device 22. With reference to FIGS. 8A to 8D, the corona ring 78 is integrally part of the wall section 40, where the metal sheet forming the section 40 are folded and curved for forming the corona ring 78. Alternatively, it can also be considered to use separate curved sheets of metal affixed at the extremity of the wall section 40. The longitudinal covers 30 are electrically insulated from the wall sections 40. In this case the longitudinal cover 30 is spaced apart by insulating spacers 36 from the case 20, and can be used as an additional wall section by providing in with a connector mountable through the case and connectable to circuitry of the switching apparatus.

Referring to FIG. 9A, two switching apparatuses are shown in a back to back configuration. A device 22 is provided around the casing of each one of the apparatuses. In other words, each apparatus is provided with its own device 22. As illustrated, the front most device 22 includes a wall 24 formed by at least two wall sections 40. Each wall section 40 has two extremities, an inner extremity located near a connecting plate 80 that is common to both switching apparatuses, and an outer extremity. The outer extremity of each wall section 40 is curved, forming a corona ring 78 on the outer side of the cylindrical shaped wall 24. The device 22 is also provided with a longitudinal cover 30, for weather protection.

Figure 9E:
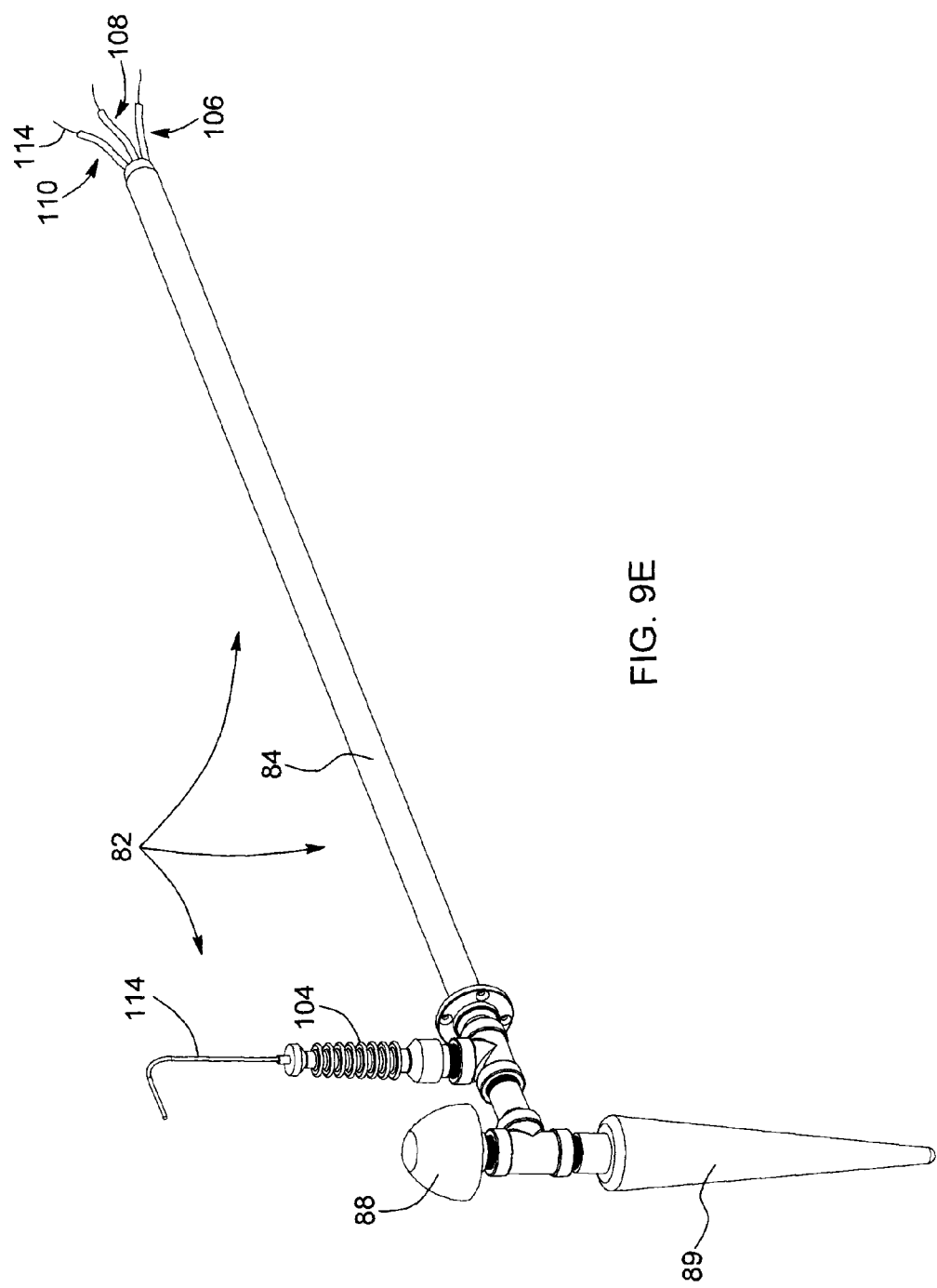
FIG. 9E is a perspective view of a component of the device of FIG. 9A.
Figure 9F:
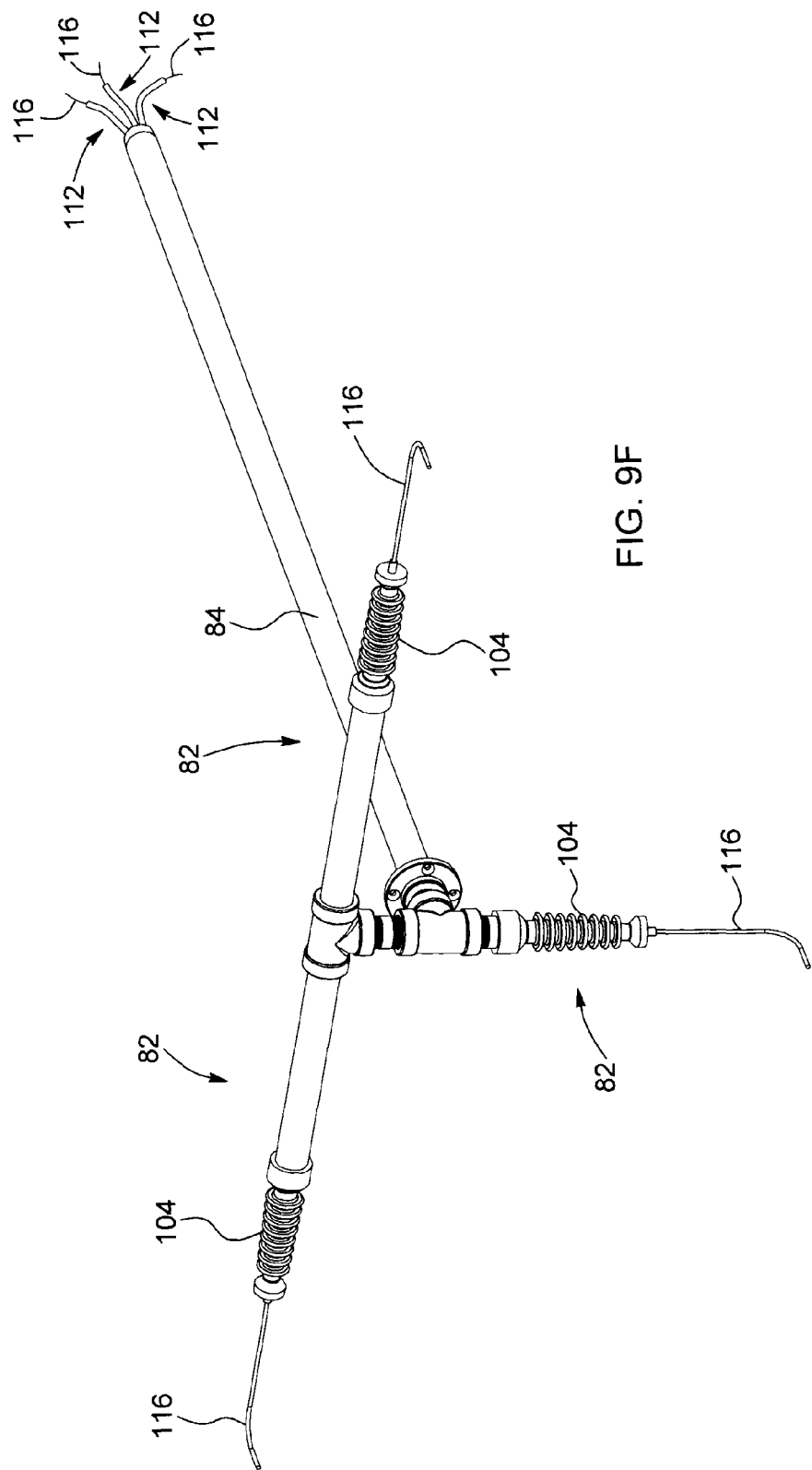
FIG. 9F is a perspective view of another component of the device of FIG. 9A.

Still referring to FIG. 9A, but also to FIGS. 9C, 9E and 9F, in which the device 22 are shown with the longitudinal covers 30 removed, each wall section 40 is provided with a connector 82. In this case, the three curved portions of the three wall sections 40 are connected to the connectors 82. Different alternatives can be considered to connect the connectors 82 to the wall sections 40. In the case illustrated, the wires terminating the connectors 82 are simply curved and can be attached to the wall sections 40 with a screw. Another alternative can consist in affixing the wires at the outer end of each connectors 82 to a screw which can be screwed on the corresponding wall sections 40.

As shown in FIGS. 9A to 9F, the connector 82 includes an axial feedthrough pipe 84, which allows transmitting the electrical current and voltage signal of each of the sections 40 to circuitry of the switching apparatus, not shown not to burden the figures. The three wall sections 40 are each connected to a corresponding connector 82, providing redundancy of the electrical current and voltage signal. Another advantage of this configuration is that it allows to install and to uninstall the device 22 with more facility, without having to remove the connectors 82 from the front plate of the casing 20, as best shown in FIG. 9C. It should be noted that the feedthroughs 86 are for connection to the four conductors of the electrical phase line, and are not part of the device 22.

Turning back to FIGS. 9A and 9D, the longitudinal cover 30 also has its outer extremity curved. The longitudinal cover 30 is electrically insulated from the wall sections 40. In addition to having an electrical connector 82 connected to each wall section 40, another electrical connector 82 is also connected to the cover 30. A GPS antenna 88 and a wireless antenna 89 can also be provided on the switching apparatus, their respective signals being relayed to circuitry located inside the casing 20, through the axial feedthrough pipe 84, as best shown in FIG. 9D.

Referring to FIG. 9E, there is shown with more detail the GPS antenna 88, the wireless antenna 89 and the connector 82 connectable to the electrically conducting cover 30. It should be noted that the connector 82 includes all components required to connect the electrically conducting cover 30 to circuitry located inside the switching apparatus (not shown in this Figure). The connector 82 includes a wire 114 connectable to the cover 30, which passes through a feedthrough pipe 84. An insulator 104 is provided since the voltage signal transmitted by this wire 114 is high voltage. The wire 114 exits the feedthrough pipe 84 as an insulated wire 110, connectable to circuitry of the switching apparatus. The insulated wires 106 and 108 are respectively for the GPS antenna 88 and the wireless antenna 89.

Now referring to FIG. 9F, three connectors 82 are shown. Each connector 82 includes a wire 116, connectable to a corresponding wall section of the device. Insulators 104 are used since the voltage signal transmitted by the wires 116 is high tension voltage. The wires 116 pass through an axial feedthrough pipe 84, exiting as insulated wires 112.

Figure 10:
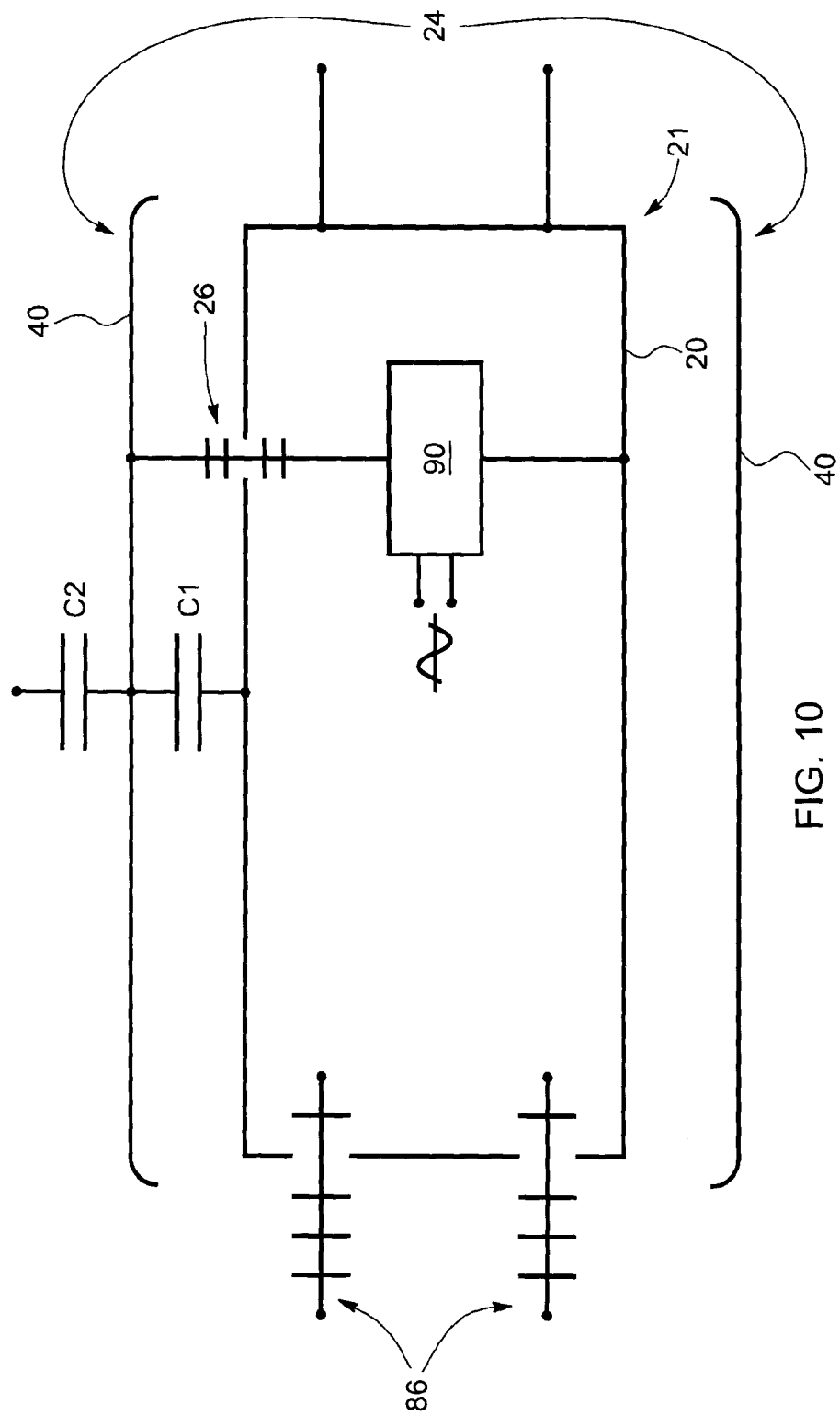
FIG. 10 is a schematic representation of a device, according to a preferred embodiment of the invention, within its environment.

Referring to FIG. 10, a device mounted around the case 20 of a switching apparatus 21 is shown. One of the wall sections 40 of the device is connected to circuitry of the switching apparatus 21 with a connector 26. The bundle axial feedthroughs 86 are for connection of the electrical conductor of the electrical phase line to inside of the switching apparatus 21. In this configuration, the circuitry of the switching apparatus 21 includes a power supply 90, having an input connected to the wall 24 via the connector 26, and an output, which can be used for power the switching apparatus 21. The power supply 90 is also connected to the case 20 of the switching apparatus 21. C1 represents the capacitance between the conducting wall section 40 of the device, and the case 20 of the switching apparatus 21. C2 represents the capacitance between the conducting wall 24 and the other surrounding elements, which can include the ground, the earth wire, the tower and/or the other line phases. Wall section 40 of the device is thus used as part of a capacitive power supply, the wall acting as a capacitive antenna. Preferably, the wall 24 is formed of at least two wall sections 40, and preferably all wall sections 40 are connected to the power supply 90, in order to provide redundancy for powering the switching apparatus 21. It can also be considered to connect only one or two of the wall sections 40.

Figure 11:
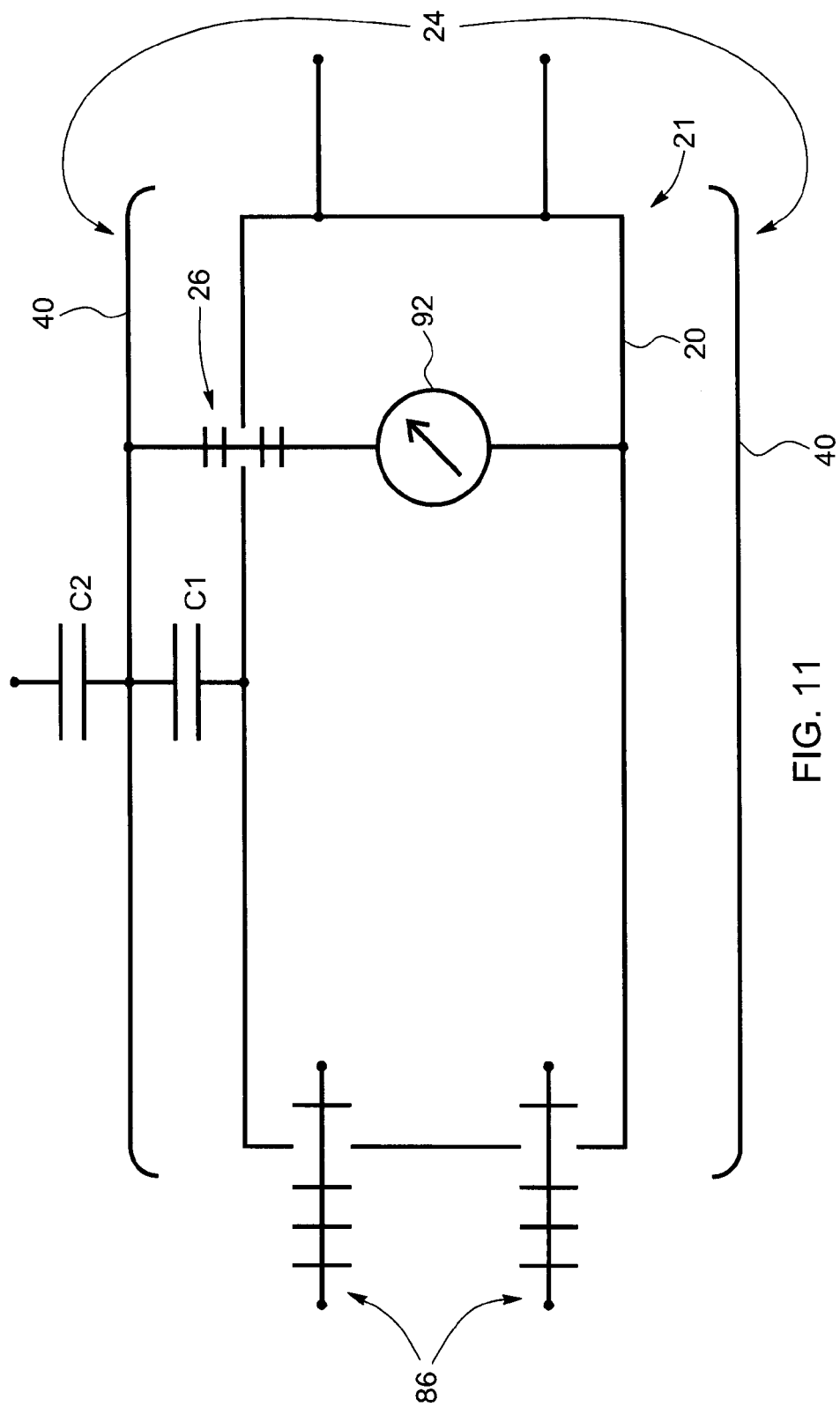
FIG. 11 is another schematic representation of a device, according to a preferred embodiment of the invention, within its environment.

Now with reference to FIG. 11, a device is shown mounted around the case 20 of a switching apparatus 21. In this case, the circuitry of the switching apparatus 21 includes a voltmeter 92 having an input connected to one of the wall sections 40 via said at least one electrical connector 26, and an output for generating a signal representative of a voltage of a phase of the electrical power line. The voltmeter is also connected to the casing 20 of the switching apparatus 21. As can be appreciated, the wall section 40 of the device can be part of capacitive potential divider, which can be used to deduct the potential of the electrical power line on which the switching apparatus 21 is mounted to. Just as for the power supply 90, the wall 24 is preferably formed by at least two wall sections 40, all sections being connected to the voltmeter 92, in order to provide redundancy for measuring the voltage of the apparatus 21. Of course, It can also be considered to connect only one or two of the wall sections 40.

Figure 12:
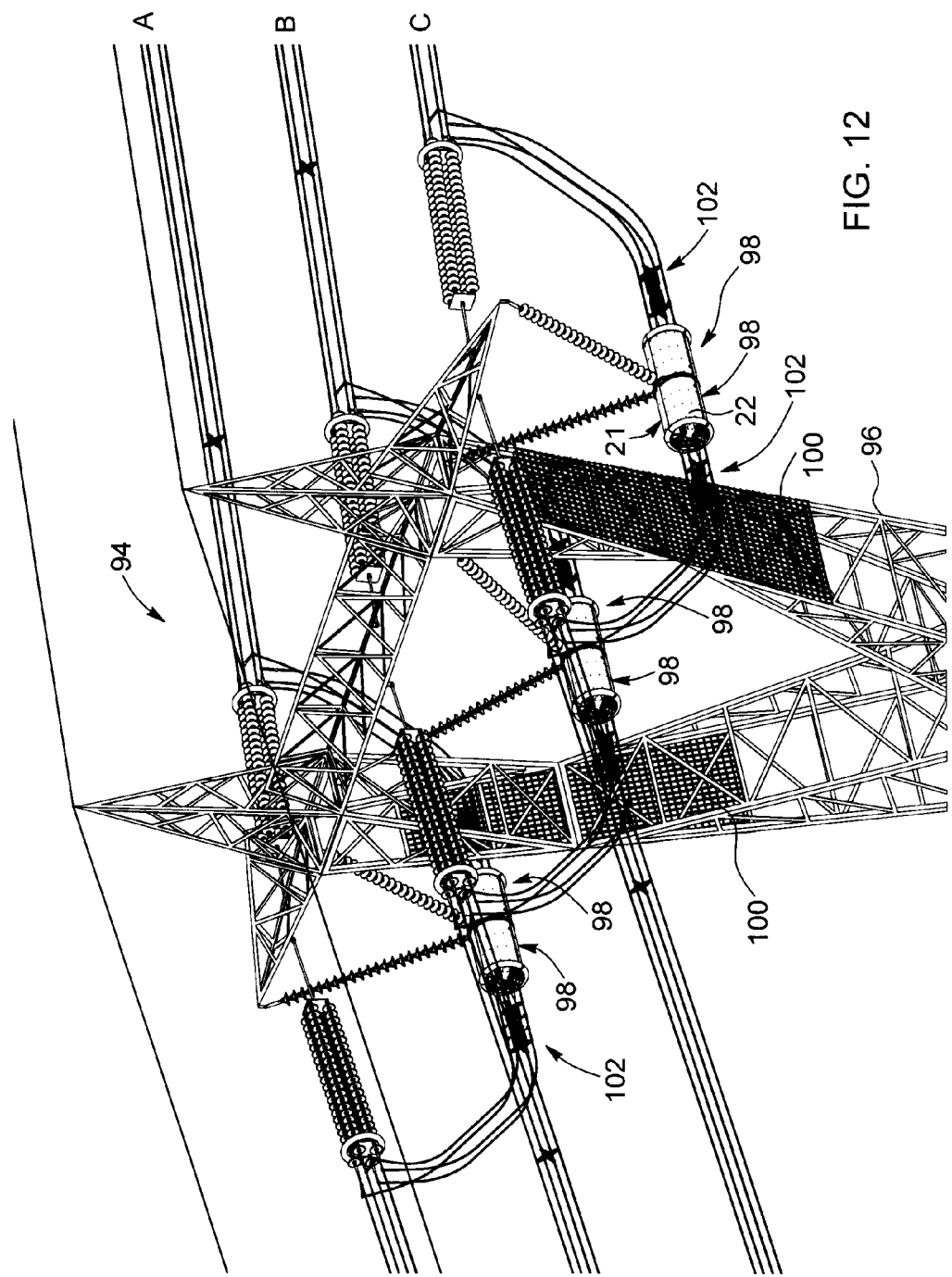
FIG. 12 is a partial perspective view of a tower for an electrical power line, according to a preferred embodiment of the invention, within its environment.

Referring now to FIG. 12, a tower 94 for an electrical power line is shown. The power line has at least two phase lines, and in the present case, three lines A, B and C are supported by the tower 94 through insulators. The tower 94 includes a frame 96. For each of the phase lines A, B, or C, a device 22 is used in combination with an outdoor switching apparatus 21, forming together a switching module 98. In the present case, the switching modules 98 are in a back-to-back configuration. Each switching module 98 is spaced apart from one another. In other words, the switching modules 98 of each phase line are spaced from one another. The tower 94 also includes at least one conducting screen 100, mounted on the frame 96 and physically positioned between two adjacent switching modules 98. Preferably, a lightning arrester module 102 is used in combination with the switching module 98. Using screens 100 between the modules 98 of each phase line advantageously allow to better define the ground electrode, which can vary according to weather conditions. For example, the ground electrode will differ according to whether there is snow on the ground or whether the ground is wet. Placing a conducting screen 100 between the switching modules 98 allows better defining the ground electrode, reducing the influence of factors such as snow or rain on the ground near the tower 94, for the corresponding wall section facing the conducting screen 100.

As can be appreciated, and with reference to FIGS. 3A to 12, the device 22 according to the invention is for being mounted around a switching apparatus 21. The device 22 is provided a wall 24, or conducting screen, which is mounted on the apparatus 21 with spacers 36. By providing the wall 24 with openings 56, or by segmenting, or splitting it into segments 40, preferably on top and on both sides, convection current can be generated thanks to the openings 56, or to the gaps 39 located between adjacent segments. This convection current is driven by either one of the heating of the wall 24 hit by sun rays, or by the heating of the switching apparatus 21. Outside air drawn within the wall 24, circulates around the case 20 in the space 38 between the wall 24 and the case 20, and cools both the switching apparatus 21 and the device 22.

In addition, if the wall 24 is made of a conductive material, such as metal, and if the spacers 36 are made of an electrically insulating material, the device 22 will "float" at a given potential with respect to the switching apparatus 21. The use of connectors 26 allows connecting the segments 40 of the wall 24 within the switching apparatus 21. Thanks to the connectors 26, an electrical voltage and current signal from the wall sections 40 can be transmitted to the appropriate electrical or electronic circuit of the apparatus 92, to measure the potential of the wall sections 40 and thereby to deduct the potential of the power line on which the switching apparatus 21 is hooked. The wall sections 40 of the device 22 can also be used as capacitive power supply 90, generated power for use by the apparatus 21. The wall sections 40 and the spacers 36 can also be mounted on articulated supports 34, such as to facilitate assembly of the device 22 around the switching apparatus 21. It can also be considered to add a grid or mesh 100 on the tower 94, in order to better define the ground electrode of the capacitive divider.

Of course, several modifications can be made to the above-described apparatus and method without going beyond the scope of the present invention. It is understood that the components and configurations are not all essential to the invention and must not be interpreted in a restricted sense in order to threshold the scope of the present invention.

The invention claimed is:

1. A device for an outdoor switching apparatus of an electrical power line, the switching apparatus being enclosed within a case, comprising:
   a wall made of electrically conductive material capable of blocking sun rays;
   a fastening assembly for fastening the wall with respect to the case in a position for blocking, at least partially, sun rays from hitting the case during day time, the fastening assembly having one or more spacers made of insulating material for spacing the wall with respect to the case, thus delimiting an air gap between the wall and the case; and
   one or more electrical connectors for electrically connecting the wall to circuitry of the switching apparatus, located inside the case.

2. The device according to claim 1, wherein the one or more spacer comprises more than one spacer.

3. The device according to claim 2, wherein the wall comprises several sections, each section of the wall being spaced apart from the case by at least one of the spacers.

4. The device according to claim 3, wherein the sections are curved for forming a cylindrical shaped wall to enclose the switching apparatus.

5. The device according to claim 4, wherein the fastening assembly comprises:
curved ribs connected respectively to internal portions of the sections of the cylindrical shaped wall by means of the spacers so that the sections of the wall are electrically insulated form the ribs;
hinges connected to ends of the ribs so that the device forms an articulated structure capable of moving between a closed position where the articulated structure has a cylindrical shape for enclosing the apparatus by having the ribs in contact with the case, and an opened position.

6. The device according to claim 5, wherein each of the spacers comprises an insulating rod extending radially between the cylindrical shaped structure and the wall.

7. The device according to claim 4, wherein each section of the wall has an extremity, on at least one side of the cylindrical shaped wall, the extremity being curved to form a corona ring on the side of the cylindrical shaped wall.

8. The device according to claim 3, wherein the wall has in its upper portion a longitudinal air gap separating two adjacent sections of the wall, the device comprising a longitudinal cover mounted above the longitudinal air gap.

9. The device according to claim 8, wherein the one or more electrical connectors comprise more than one electrical connector, where each section of the wall is electrically insulated, and wherein the electrical connectors are respectively connected to the sections of the wall.

10. The device according to claim 9, wherein the longitudinal cover is electrically insulated from the sections of the wall, and the one or more electrical connectors comprises an electrical connector connected to the longitudinal cover.

11. The device according to claim 3, wherein the one or more electrical connectors comprise more than one electrical connector, wherein each section of the wall is electrically insulated from one another, and wherein the electrical connectors are respectively connected to the sections of the wall.

12. The device according to claim 1, wherein the one or more electrical connectors comprises a radial feedthrough mountable through the case of the switching apparatus.

13. The device according claim 1, wherein the one or more electrical connectors comprises an axial feedthrough mountable through the case of the switching apparatus.

14. The device according to claim 1, in combination with the outdoor switching apparatus, wherein the circuitry of the outdoor switching apparatus comprises a power supply having an input connected to the wall via the one or more electrical connectors, and an output for powering the switching apparatus.

15. The device according to claim 1, in combination with the outdoor switching apparatus, wherein the circuitry of the switching apparatus comprises a voltmeter having an input connected to the wall via the one or more electrical connectors, and an output for generating a signal representative of a voltage on a phase of the electrical power line.

16. The device according to claim 1, wherein the wall is provided with at least two openings, one of the openings being higher than the other opening to allow air convection current to circulate through at least two openings.

17. A tower for an electrical power line having at least two phase lines, the tower comprising a frame and, for each of the phase line, a device according to claim 1, in combination with the outdoor switching apparatus to form a switching module, each switching module being spaced apart from one another, the tower also comprising at least one conducting screen mounted on the frame and physically positioned between two adjacent switching modules.

* * * * *

UNITED STATES PATENT AND TRADEMARK OFFICE
CERTIFICATE OF CORRECTION

| | | |
|---|---|---|
| PATENT NO. | : 9,530,583 B2 | Page 1 of 1 |
| APPLICATION NO. | : 14/372155 | |
| DATED | : December 27, 2016 | |
| INVENTOR(S) | : Pierre Couture | |

It is certified that error appears in the above-identified patent and that said Letters Patent is hereby corrected as shown below:

In the Claims

In Column 10, Claim 2, Line 64, before "more than one" replace "spacer comprises" with --spacers comprise--.

In Column 11, Claim 6, Line 17, before "an insulating rod" replace "comprises" with --comprise--.

In Column 11, Claim 9, Line 29, before "each section of" replace "where" with --wherein--.

In Column 12, Claim 12, Line 6, after "electrical connectors" replace "comprises" with --comprise--.

Signed and Sealed this
Second Day of May, 2017

Michelle K. Lee
*Director of the United States Patent and Trademark Office*